（12) United States Patent
Aguirre et al.

(10) Patent No.: US 9,215,619 B2
(45) Date of Patent: Dec. 15, 2015

(54) METHOD AND SYSTEM FOR APPLICATION-AWARE LOAD BALANCING

(71) Applicant: Verizon Patent and Licensing Inc., Basking Ridge, NJ (US)

(72) Inventors: Sergio Aguirre, Southlake, TX (US); Raafat Edward Kamel, Little Falls, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 349 days.

(21) Appl. No.: 13/751,908

(22) Filed: Jan. 28, 2013

(65) Prior Publication Data

US 2014/0211698 A1 Jul. 31, 2014

(51) Int. Cl.
*H04W 28/08* (2009.01)
*H04L 12/911* (2013.01)
*H04L 12/927* (2013.01)
*H04W 12/08* (2009.01)
*H04W 72/04* (2009.01)

(52) U.S. Cl.
CPC ............ *H04W 28/085* (2013.01); *H04L 47/70* (2013.01); *H04L 47/803* (2013.01); *H04L 47/805* (2013.01); *H04W 12/08* (2013.01); *H04W 72/0453* (2013.01)

(58) Field of Classification Search
CPC ... H04W 28/085; H04L 47/70; H04L 47/805; H04L 47/803
See application file for complete search history.

(56) References Cited

U.S. PATENT DOCUMENTS

| 8,385,217 | B2 * | 2/2013 | Zhang et al. | 370/252 |
| 8,553,861 | B1 * | 10/2013 | Singh | 379/112.1 |
| 2010/0111004 | A1 * | 5/2010 | Yi et al. | 370/329 |
| 2011/0176424 | A1 * | 7/2011 | Yang et al. | 370/236.2 |
| 2012/0077506 | A1 * | 3/2012 | Wietfeldt et al. | 455/450 |
| 2012/0236712 | A1 * | 9/2012 | Park et al. | 370/230 |
| 2013/0279346 | A1 * | 10/2013 | Zhang | 370/241.1 |
| 2014/0029425 | A1 * | 1/2014 | Rege et al. | 370/235 |

* cited by examiner

*Primary Examiner* — Omer S Mian

(57) ABSTRACT

An approach for providing application-aware load balancing is provided. A load balancing platform at a base station receives application information specifying an application or type of service utilized by a mobile device and determines allocation of a plurality of carriers based on the received application information to provide load balancing across the plurality of carriers. The platform generates mapping information indicating a mapping of a plurality of applications to one or more of the plurality of carriers, wherein the application information includes the generated mapping information.

16 Claims, 7 Drawing Sheets

METHOD AND SYSTEM FOR APPLICATION-AWARE LOAD BALANCING

BACKGROUND INFORMATION

The growth and adoption of advanced standards for wireless communication continues to drive the growth of applications (e.g., voice, video, social networking, email, etc.) as well as other data-intensive services. Wireless network operators (hereinafter "operators") seeking to maximize the revenue generating opportunities available by offering such applications require greater flexibility in the provisioning of their access networks. For example, certain applications may be more heavily accessed by users during events (e.g., a social networking application during a football game) or in certain locations (e.g., an email application at business offices). However, current load balancing schemes do not allow operators to provision application-specific load balancing policies in their wireless access networks. Lack of such provisioning capabilities prevents existing load balancing schemes from allocating capacity to particular applications.

Therefore, there is a need for an approach to load balancing that allows operators to allocate and manage application-specific capacity in wireless access networks.

BRIEF DESCRIPTION OF THE DRAWINGS

Various embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for application-aware load balancing are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
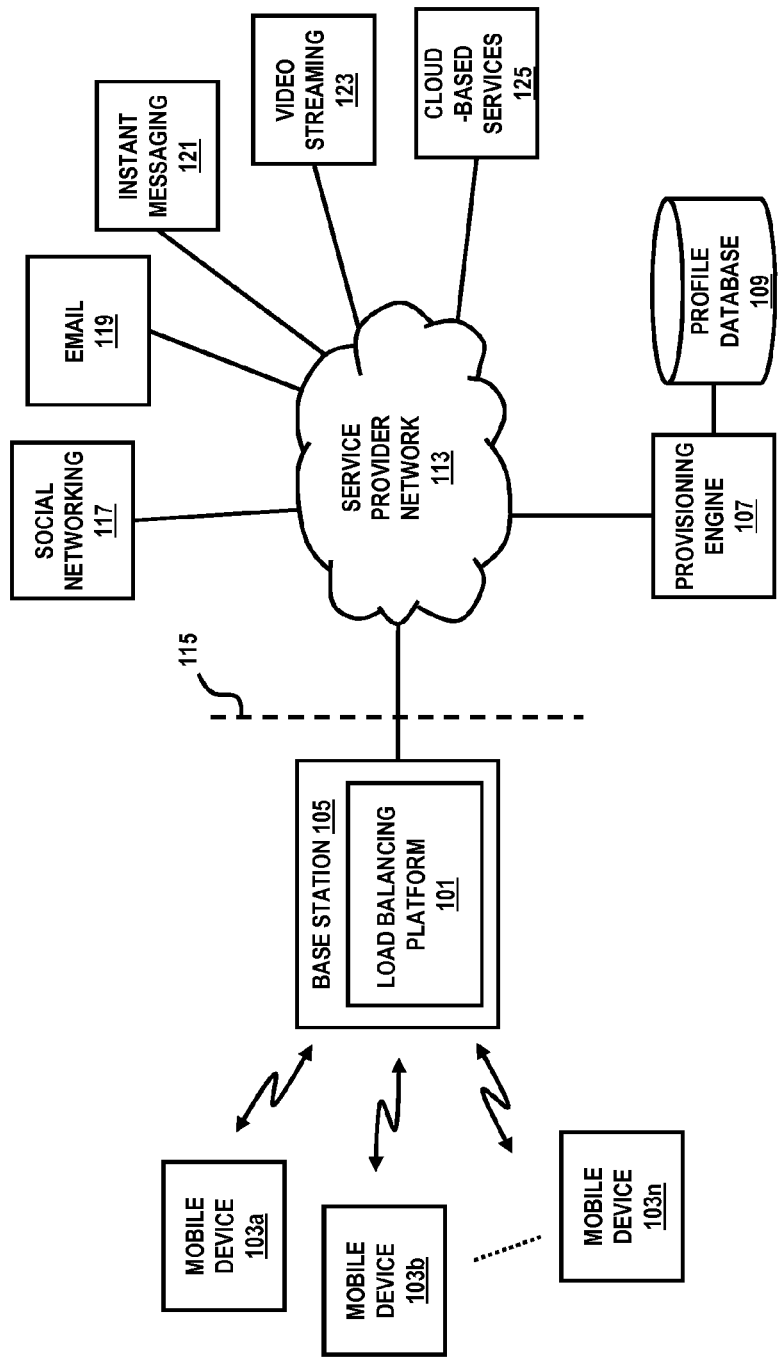
FIG. 1 is a diagram of a system capable of providing application-aware load balancing, according to an embodiment.

FIG. 1 is a diagram of a system capable of providing application-aware load balancing, according to an embodiment. For the purpose of illustration, an operator of wireless network may desire to allocate bandwidth and implement call admission policies for a particular application. The one or more applications may include, for example, social networking application 117 (e.g., Facebook, Twitter, etc.), email application 119 (e.g., Gmail, Yahoo, AOL, etc.), instant messaging application 121 (e.g., Google Chat, Yahoo IM, etc.), or video streaming application 123 (e.g., Hulu, Netflix, etc.), among others. Specifically, the operator may desire to allocate bandwidth at base station for the application such that users receive a certain Quality of Service (QOS) when accessing it. System 100 provides this capability through the use of a load balancing platform 101, which in certain embodiments can be implemented with a base station 105.

Base station 105 wirelessly communicates with one or more mobile devices 103 over a wireless air interface. Various frame structures may be utilized to organize the temporal and spectral resources of the wireless air interface. In one embodiment, base station 105 may manage its radio frequency resources by allocating one or more carrier frequencies (hereinafter "carriers") for a predetermined amount of time to a particular user. At the end of that time, the user may be moved to a different carrier or reassigned to the same carrier. By way of illustration, the available bandwidth of base station 105 may be divided among multiple carriers, the total number of carriers depending on the overall transmission bandwidth of the system. In the temporal direction, the frame may be divided into multiple timeslots. Thus, base station 105 may communicate with a mobile device (e.g., mobile device 103a) by modulating a particular carrier for a particular timeslot.

Base station 105 may schedule carriers among mobile devices 103 so as to distribute the traffic load evenly among the carriers. As shown, base station 105 may include load balancing platform 101 to allocate carriers among mobile devices 103 according to various load balancing policies configured on base station 105. Based on the configured policies and various physical constraints, load balancing platform 101 may determine whether to limit the number of mobile devices 103 connected to base station 105. Physical constraints may include, for example, resource limits such as bandwidth or the number of modems at base station 105. Load balancing platform 101 may also take into consideration various radio frequency (RF) measurements reported by mobile devices 103, including Reference Signal Received Power (RSRP), Reference Signal Received Quality (RSRQ), and Signal to Interference plus Noise Ratio (SINR).

In one embodiment, base station 105 may be configured to allocate a certain amount of bandwidth per carrier to a particular application. Thus, in addition to allocating bandwidth among different traffic classes (e.g., constant bit rate (CBR), guaranteed bit rate (GBR) and best effort (BE)), a percentage of the bandwidth may be assigned to a specific application (e.g., Twitter or Facebook). Load balancing platform 101 may monitor these classes, including the per-carrier application bandwidth, for their bandwidth usage so as to only admit new connections if there is sufficient available bandwidth in the class.

Base station 105 may be configured statically, semi-statically, dynamically, or according to an event. A static configuration refers to a set of call admission and scheduling policies that may remain in place for an indefinite period of time lasting weeks, months, or even years. A semi-static configuration takes effect at a particular date and time and may remain active anywhere from a few hours to several days. A dynamic configuration may take effect when a user attempts to access a particular application and lasts as long as the application is being accessed. Resultantly, dynamic configurations may be very short-lived. An event-driven configuration may take effect during a particular event (e.g., public sporting event, political rally, etc.). Both semi-static and event-driven configurations may require configuration by a network operator. Dynamic configurations may also be configured by the network operator. However, base station 105 may also be able to automatically configure itself based on information contained within a user profile. For example, a user profile may indicate a subscription to instant messaging application 121. Base station 105 may automatically configure a dynamic mapping of one or more carriers to instant messaging application 121 based on this information.

Load balancing platform 101 may employ various software-based algorithms to evenly distribute bandwidth usage by traffic classes and applications. The algorithms may iteratively execute and determine to constrain the bandwidth resources of base station 105 for certain classes of traffic while freeing up bandwidth for other classes. In one embodiment, their function may be formulated as a scheduling problem with respect to admitting or denying mobile devices 103 to connect to base station 105 via a particular carrier. The algorithms may resolve this problem by employing a proportional-fair (PF) scheduling scheme to assign bandwidth to competing users. For QOS support, a weighted PF scheduling scheme may be utilized. Based on their results, base station 105 may determine to add or move connections among carriers to maintain a target load level per carrier.

In one embodiment, system 100 may include provisioning engine 107. As shown, provisioning engine 107 may be connected to base station 105 via service provider network 113. Provisioning engine 107 may serve as a control node for base station 105. It may be responsible for configuring base station 105 as well as performing a number of other functions to manage users, including user authentication. The wireless network operator may perform configuration duties at provisioning engine 107 in order to provision various application-aware load balancing policies at base station 105.

As shown, provisioning engine 107 may communicate with base station 105 over O&M interface 115. O&M interface 115 may be operated over various physical connections, including fiber optic cables, copper lines, microwave links, etc. Although O&M interface 115 may describe a physical interface, it may also refer to a software-based virtual interface residing on both base station 105 and provisioning engine 107. Further, although O&M interface 115 may share the same physical connection utilized for application data, it may be conceptually understood to define a separate control plane protocol for exchanging O&M messages (described in FIGS. 3A and 3B). Thus, upon receiving an O&M message, base station 105 may forward it to load balancing platform 101 instead of transmitting it to mobile devices 103.

In certain embodiments, provisioning engine 107 may include or have access to user profiles in profile database 109. Provisioning engine 107 may access profile database 109 to acquire information relating to one or more mobile devices belonging to a particular user. A user profile may also include a list of applications the user is authorized to access along with other related information, including usernames, passwords, contact information and the like. Mobile device information may include various features of mobile devices owned by the user, including multiband support. The user profiles may be maintained and updated by the operator based on changes to a user's subscriptions and/or service-level agreements.

Mobile devices 103 may be any type of user equipment supporting wireless connectivity to base station 105, including a mobile handset, mobile station, mobile unit, multimedia computer, multimedia tablet, communicator, netbook, Personal Digital Assistants (PDAs), smartphone, media receiver, etc. Further, mobile devices 103 may support any type of interface for supporting the presentment or exchange of data obtained by accessing various applications or services via service provider network 113. For example, mobile devices 103 may communicate with social networking application 117, email application 119, instant messaging application 121, video streaming application 123, or cloud-based service 125 over an Internet Protocol (IP)-based, packet-switched networking infrastructure.

It is contemplated that base station 105 may provide radio access to mobile devices 103 within various cellular configurations, including a macrocell (including picocells embedded within the macrocell), microcell, or femtocell. Thus, base station 105 may provide connectivity over areas ranging from several kilometers in diameter (e.g., a macrocell in a rural area) to a few meters (e.g., a femtocell within a home or business). Various physical layer signaling schemes may be utilized for the radio access between base station 105 and mobile devices 103, including orthogonal frequency-division multiplexing access (OFDM) and single-carrier frequency division multiplexing (SC-FDMA).

It is further contemplated that system 100 may include additional base stations (not shown) also connected to provisioning engine 107 via O&M interface 115. The base stations may also be connected directly to each other such that they can exchange signaling and load information. Specifically, load balancing platform 101 may exchange load information with corresponding load balancing platforms of neighboring base stations (not shown) to enable multi-cell load balancing and to avoid load imbalance among the base stations. As a result of exchanging information, a mobile device (e.g., mobile device 103a) may be caused to move from base station 105 to a neighboring base station (not shown) in order to more evenly distribute the load on the wireless access network. In one embodiment, base station 105 may be configured jointly with one or more neighboring base stations (not shown) to provide application-aware load balancing in a specific geographical area ("hotspot" scenario). In such a scenario, the aggregate bandwidth capacity of a certain carrier may be allocated across multiple base stations for a particular application.

As mentioned, recent developments have driven the growth of mobile applications, including voice, video, social networking, email and other data-intensive services. Certain applications may be more heavily used than others at certain times or locations. However, the base stations may not be able to allocate bandwidth for specific applications. Additionally, network operators may desire to maximize revenue from users accessing specific applications.

To address this issue, the system 100 of FIG. 1 introduces the capability to configure radio access networks to allocate capacity to specific applications. By way of example, base station 105 may be configured via O&M interface 115 to allocate carrier bandwidth to an application (e.g., instant messaging application 121). Further, neighboring base stations (not shown) may be configured in a coordinated manner via O&M interface 115 to extend the capacity for a particular application in a hotspot. Furthermore, base station 105 may be configured statically, semi-statically, dynamically, or according to an event. A static allocation may remain in place for an indefinite period of time lasting weeks, months, or years. A semi-static allocation of capacity may be configured to begin and end at specific times and to last for several days. An event-based allocation may be scheduled for a few hours to correspond to a particular event (e.g., music concert or basketball game). A dynamic configuration may be triggered by a user attempting to access a particular application (e.g., email application 119) and may remain in place for only so long as the access continues.

Figure 2:
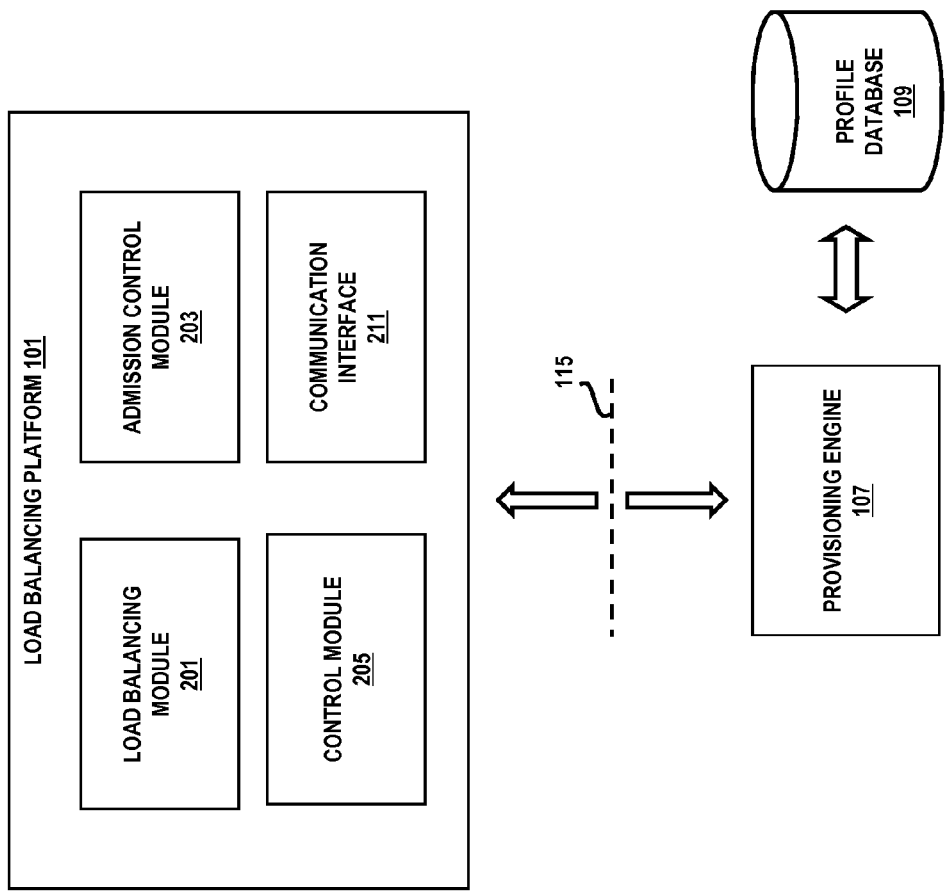
FIG. 2 is a diagram of the components of an application-aware load balancing platform, according to an embodiment.

FIG. 2 is a diagram of the components of load balancing platform 101, according to an embodiment. Load balancing platform 101 may comprise computing hardware (such as described with respect to FIG. 6), as well as include one or more components configured to execute the processes described herein for providing application-aware load balancing of the system 100. It is contemplated that the functions of these components may be combined in one or more components or performed by other components of equivalent functionality. In one implementation, load balancing platform 101 includes load balancing module 201, admission control module 203, control module 205, and communication interface 211.

Load balancing module 201 may balance an uneven or undesired distribution of load among carriers by periodically moving reassigning users among the carriers. Thus, the module 201 may redistribute the load among the carriers such that the aggregate bandwidth of base station 105 satisfies certain criteria—e.g., even utilization within the carriers. Simultaneously, load balancing module 201 may maintain the QOS of in-progress connections. Load balancing module 201 may also exchange load information with corresponding load balancing modules in neighboring base stations to redistribute traffic from heavily loaded to underutilized cells.

In one embodiment, load balancing module 201 may allocate a specific percentage capacity of a carrier's bandwidth to a particular application in addition to (and/or in the alternative to) allocating bandwidth for various classes of QOS. For instance, application-aware bandwidth allocation policies from provisioning engine 107 may constrain the scheduling activities of load balancing module 201 to achieve a desired bandwidth for video streaming application 123. The resulting distribution of traffic at the carrier may thus reflect a sharing of the carrier's total bandwidth among multiple categories. For example, a particular carrier may be configured to provide 50% bandwidth for BE traffic, 30% bandwidth for CBR traffic, and 10% bandwidth for traffic belonging to video streaming application 123.

In one embodiment, load balancing module 201 may achieve the desired load balancing requirement by employing various software-based algorithms to identify users for reassignment/rescheduling. The algorithms may implement various strategies to assign bandwidth to competing users. For example, a PF algorithm may provide approximately equal bandwidth to competing users, whereas a weighted PF scheduling algorithm may discriminate against different classes of traffic based on a specific QOS requirement. For example, traffic belonging to BE, CBR and GBR classes may be more often scheduled by load balancing module 201. In a similar fashion, load balancing module 201 may discriminate in favor of application-specific traffic by scheduling such traffic ahead of other traffic. Thus, users may experience improved or throttled performance while accessing an application identified for application-aware load balancing on base station 105.

In one embodiment, load balancing module 201 may receive bandwidth allocation information from provisioning engine 107. This information may indicate the allocation of bandwidth among various classes of traffic, including an allocation for a specific application, for each of one or more carriers. The allocation may be indicated as a ratio or percentage of the carrier's bandwidth. For example, it may indicate that 50% of a certain carrier's bandwidth is allocated to BE traffic class, 30% to CBE traffic class, and 10% to social networking application 117. In another embodiment, admission control module 203 may partition the bandwidth of a particular carrier as a result of establishing call admission policies for the carrier. In this way, admission control module 203 may establish the bandwidth partitioning for load balancing module 201.

In one embodiment, load balancing platform 101 may include admission control module 203 for implementing various call admission policies with respect to calls originating from mobile devices 103. Thus, admission control module 203 may serve as a gatekeeper to limit the number of mobile devices 103 connected to a particular carrier. The call admission policies may also serve to determine the user reassignment and rescheduling activities of load balancing module 201. Thus, admission control module 203 may also serve as a gatekeeper when load balancing module 201 determines to move a user between carriers.

In a certain embodiment, admission control module 203 may determine the call admission policies based on mapping information received from provisioning engine 107. The mapping information may indicate a mapping between one or more applications and one or more carriers. The one or more applications may include, for example, social networking application 117 (e.g., Facebook, Twitter, etc.), email application 119 (e.g., Gmail, Yahoo, AOL, etc.), instant messaging application 121 (e.g., Google Chat, Yahoo IM, etc.), and video streaming application 123 (e.g., YouTube, Vimeo, etc.), among others. The one or more carriers may include various carrier frequencies supported by base station 105.

Admission control module 203 may determine additional call admission policies based on authorization information received from provisioning engine 107. The authorization information may indicate a list of applications or services that each of one or more users is authorized to access. Thus, the authorization information may comprise a mapping between one or more users and one or more applications. In one embodiment, this authorization information may be obtained from user profiles stored in profile database 109.

Admission control module 203 may also determine call admission policies based on multiband capability information received from provisioning engine 107. Specifically, in determining whether a particular user may be reassigned to a different band, admission control module 203 may take into consideration whether the user's mobile device (e.g., mobile device 103a) supports multiple bands ("multiband device"). In one embodiment, the multiband capability information of a particular user may be obtained from his or her user profile stored in profile database 109.

In one embodiment, the call admission policies of admission control module 203 may be associated with specific time periods. For example, a bandwidth partitioning policy may be static, semi-static, or based on an event. A static partitioning may remain in place for an indefinite period of time lasting weeks, months, or years. A semi-static partitioning begins at a predetermined time and may remain in place anywhere from a few hours to several days. An event-based (or event-driven) bandwidth partitioning may remain in place for a few hours corresponding to an event (e.g., a music concert). In a certain embodiment, the partitioning may be dynamic. A dynamic provisioning begins when a user attempts to access an application (e.g., instant messaging application 121) and may last for only as long as the application is being accessed. To determine whether the application is being accessed, admission control module 203 may monitor the traffic from mobile device 103. Shortly after detecting instant messaging traffic, admission control module 203 may partition the capacity of the carrier to allocate bandwidth to the application.

In certain embodiments, a call may be assigned to a carrier that is not mapped to an application the user of the mobile device (e.g., mobile device 103a) is subscribed to. However, if admission control module 203 detects that the user is attempting to access the application, it may cause mobile device 103a to request base station 105 for a handoff to the carrier that supports the requested application.

In one embodiment, load balancing platform 101 may include control module 205 for configuring load balancing platform 101 to perform application-aware load balancing. Control module 205 may process O&M messages received from provisioning engine 107. In addition, control module 205 may generate O&M messages for provisioning engine 107 and corresponding control modules in neighboring base stations (not shown). In configuring load balancing platform 101 to perform application-aware load balancing, control module 205 may coordinate the configurations of load balancing module 201 and admission control module 203 with the timing information received from provisioning engine 107. In the case of dynamic timing, control module 203 may monitor the traffic on various carriers to determine if a user is attempting to access a mapped application.

Load balancing platform 101 may further include communication interface 211 to communicate with other components of load balancing platform 101 and with provisioning engine 107 over O&M interface 115. Communication interface 211 may include multiple means of communication. For example, communication interface 211 may be able to communicate over short message service (SMS), multimedia messaging service (MMS), internet protocol, instant messaging, voice sessions (e.g., via a phone network), email, or other types of communication. Additionally, communication interface 211 may include a web portal accessible by, for example, provisioning engine 107.

In one embodiment, load balancing platform 101 may receive provisioning information from provisioning engine 107. Provisioning engine 107 may maintain provisioning information for base station 105, including bandwidth partitioning information, application mapping information, and user authorization information. In addition, provisioning engine 107 may maintain timing information associated with the bandwidth partitioning and carrier-specific application mapping information.

As shown, provisioning engine 107 may include or be connected to profile database 109. Profile database 109 may contain user-related and subscription-related information. The user-related information may be stored in the form of profiles. The profiles may be utilized to perform user authentication and access authorization. The subscription-related information may indicate the list of applications or services a particular user is authorized to access.

It is contemplated that to prevent unauthorized access, load balancing platform 101 may include an authentication identifier when transmitting signals to provisioning engine 107. For instance, O&M messages may be encrypted, either symmetrically or asymmetrically, such that a hash value, for instance, can be utilized to authenticate received control signals, as well as ensure that those signals have not been impermissibly alerted in transit. As such, communications between provisioning engine 107 and load balancing platform 101 may include various identifiers, keys, random numbers, random handshakes, digital signatures, and the like.

Figure 3A:
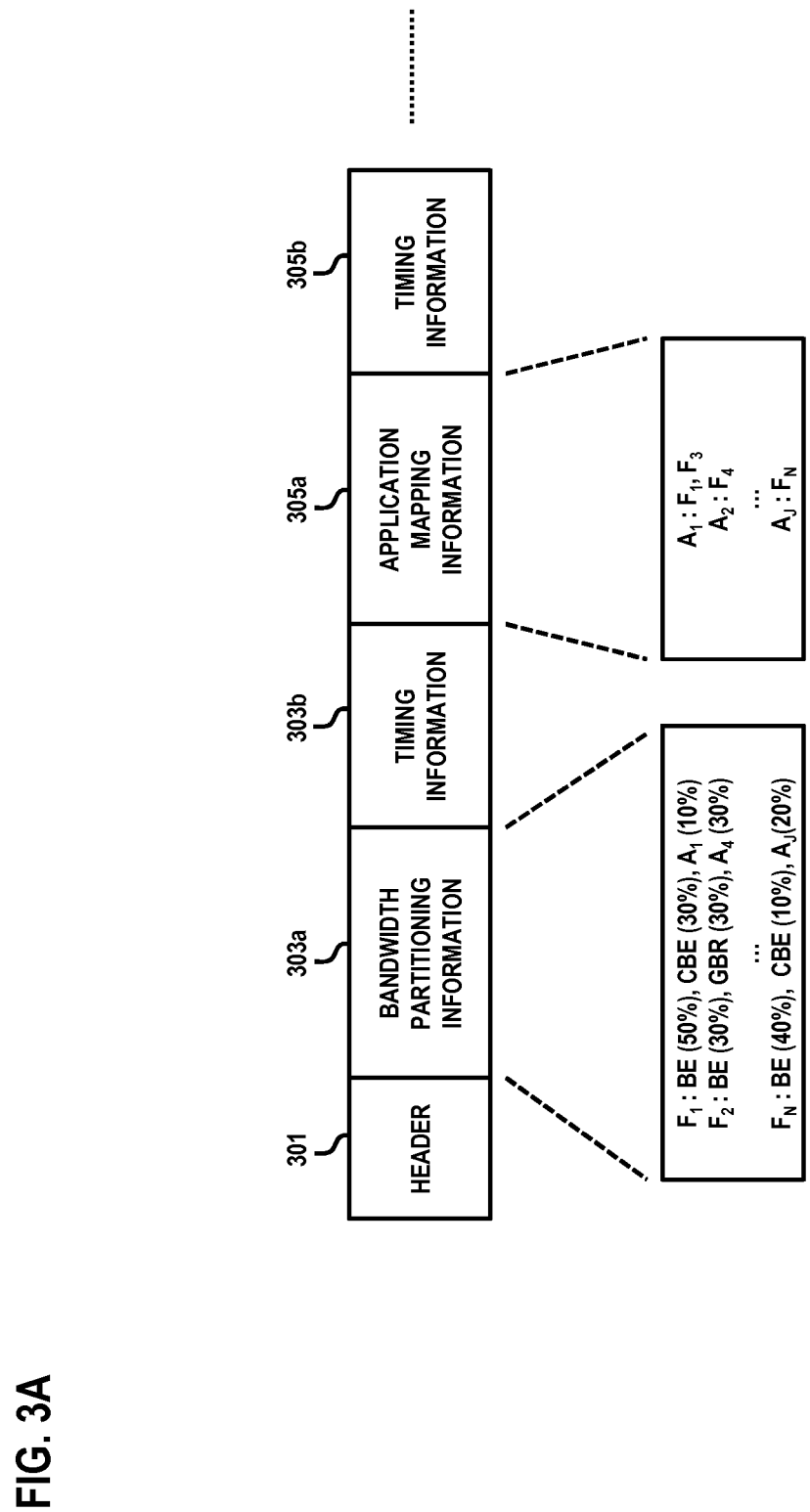
FIGS. 3A and 3B are diagrams of the fields of an Operation & Management (O&M) message, according to an embodiment.
Figure 3B:
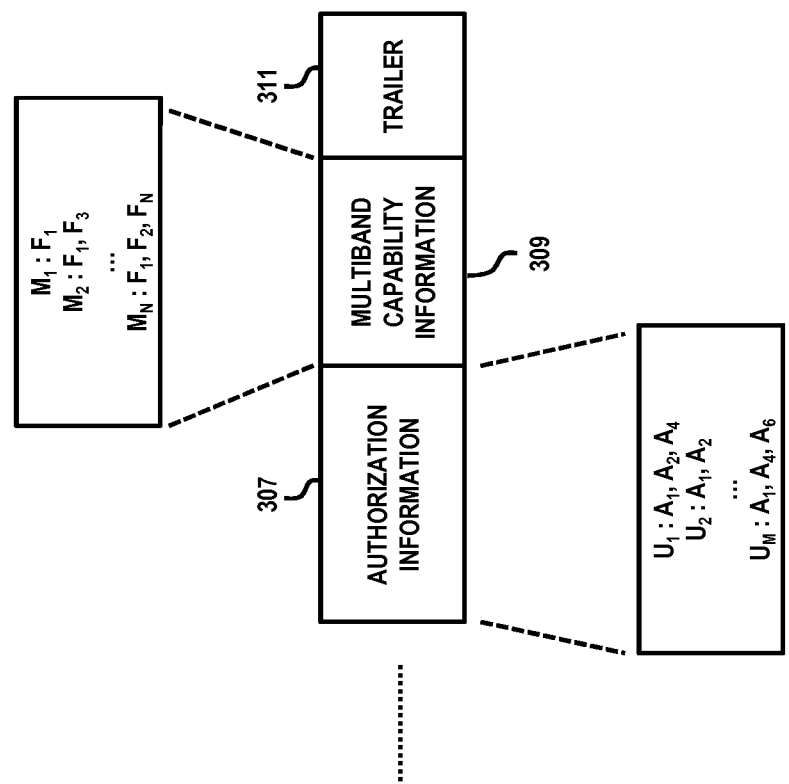

FIGS. 3A and 3B are diagrams of an O&M message 300, according to an exemplary embodiment. O&M message 300 may be exchanged between provisioning engine 107 and load balancing platform 101 via O&M interface 115 and may contain various information elements or fields for provisioning base station 105, including bandwidth partitioning information 303a, application mapping information 305a, authorization information 307, and multiband capability information 309. O&M message 300 may also contain timing information 303b associated with the bandwidth partitioning information 303a and timing information 305b associated with application mapping information 305a.

In one embodiment, O&M message 300 may include bandwidth partitioning information 303a indicating the allocation of bandwidth among various classes of traffic for each of one or more carriers. As shown in FIG. 3A, the allocation may be indicated as a ratio or percentage of the carrier's bandwidth and may include an allocation for a specific application. For example, bandwidth partitioning information 303a may indicate that 50% of carrier $F_1$'s bandwidth is allocated to BE traffic class, 30% to CBE traffic class, and 10% to application $A_1$. Similarly, the allocation of bandwidth among various classes of traffic may be indicated for other carriers $F_2 \ldots F_N$.

In one embodiment, O&M message 300 may include timing information 303b corresponding to the bandwidth partitioning information 303a. Timing information 303b may indicate various time periods for which the partitioning information in bandwidth partitioning information 303a should take effect. The time periods may be static, semi-static, dynamic, or event-based. A static timing may remain in place for an indefinite period of time lasting weeks, months, or years. A semi-static timing may indicate that the bandwidth partitioning is to begin at a specified time and last for a specified duration lasting anywhere from a couple of hours to several days. Event-based timing may also indicate that the bandwidth partitioning is to begin at a specified time and last for a specified duration; however, the duration in this instance may be limited to the duration of a particular event (e.g., basketball game). Dynamic timing may indicate that a bandwidth partitioning according to bandwidth partitioning information 303a a should begin when a particular the traffic of a particular application is detected by load balancing module 201. Such a partitioning may last as long as the application's traffic is detected. When it can no longer be detected, the bandwidth allocation of the carrier may automatically revert to a default configuration.

Bandwidth partitioning information 303a may be received by load balancing platform 101 at any time before the period specified by timing information 303b. Control module 205 may configure admission control module 203 to automatically implement call admission policies according to bandwidth partitioning information 303a when the period specified by timing information 303b begins. At the end of the period, the policies may revert to a default configuration and the bandwidth resources of base station 105 may be returned to a pool of available resources.

In one embodiment, O&M message 300 may include application mapping information 305a. Application mapping information 305a may indicate a mapping between the set of applications $A=\{A_1 \ldots A_J\}$ and a set of carriers $F=\{F_1 \ldots F_N\}$. The set of applications A may include, for example, social networking application 117 (e.g., Facebook, Twitter, etc.), email application 119 (e.g., Gmail, Yahoo, AOL, etc.), instant messaging application 121 (e.g., Google Chat, Yahoo IM, etc.), or video streaming application 123 (e.g., YouTube, Vimeo, etc.) among others. The set of carriers F may include various carrier frequencies supported by base station 105. The carrier frequency may be indicated by various means, including but not limited to an alphanumeric identifier (e.g., operating band "IV") or the approximate center frequency of the operating band (e.g., 2100 MHz). The specific mapping may be indicated in a variety of ways. As shown in FIG. 3A, the mapping may be provided in the form of a list indexed by application name (e.g., application $A_1$ is mapped to carriers $F_1$ and $F_3$, application $A_2$ is mapped to carrier $F_4$).

As in the case of bandwidth partitioning information 303a, O&M message 300 may also include timing information 305b corresponding to application mapping information 305a. Timing information 305b may indicate a time period for which the application mapping in application mapping information 305a should take effect. Timing information 305b may indicate that the application mapping indicated by application mapping information 305a is static, semi-static, dynamic, or event-driven. A static mapping may remain in place for an indefinite period of time lasting weeks, months, or years. A semi-static mapping may indicate that the mapping is to begin at a specified time and last for a specified duration lasting anywhere from a couple of hours to several days. Event-driven mapping may also indicate that the mapping is to begin at a specified time and last for a specified duration; however, the duration in this instance may be limited to the duration of a particular event (e.g., basketball game). Dynamic mapping may indicate that the mapping should be implemented when a particular class of traffic is detected. For example, a mapping according to application mapping information 305a may be triggered at, or shortly after, the time base station 105 detects a particular application or service being accessed by mobile devices 103. A dynamic mapping may last for as long as a particular class of traffic is detected.

In one embodiment, O&M message 300 may include authorization information 307 indicating a list of applications or services that each of one or more users is authorized to access. Authorization information 307 may comprise a mapping between a set of users $U=\{U_1 \ldots U_M\}$ and the set of applications $A=\{A_1 \ldots A_J\}$. As shown in FIG. 3B, the mapping may be provided in the form of a list indexed by user identifier (e.g., user $U_1$ is authorized to access applications $A_1, A_2, A_4$; user $U_2$ is authorized to access applications $A_1$ and $A_2$, etc.). Authorization information 307 may be based on user profiles stored in profile database 109.

In one embodiment, O&M message 300 may include multiband capability information 309 indicating whether one or more mobile devices 103 can operate on more than one frequency band (e.g., dual-band, tri-band, quad-band, etc.). As shown in FIG. 3B, this information may be provided in the form of a list indexed by mobile device (e.g., mobile device $M_1$ only operates on one band ($B_1$), mobile device $M_2$ can operate on two bands ($B_2$ and $B_3$), etc.). Multiband capability information 309 may be based on user profiles stored in profile database 109.

In one embodiment, O&M message 300 may include a header 301 and trailer 311. As shown in FIG. 3A, header 301 may include information indicating the beginning of O&M message 300. It may also include information characterizing the length of O&M message 300, a timestamp indicating when the message was sent, and the addresses of the sender and recipient. As shown in FIG. 3B, trailer 311 may include information indicating the ending of O&M message 300.

It is contemplated that O&M message 300 may comply with a variety of message exchange protocols. For example, it may be exchanged over short message service (SMS), multimedia messaging service (MMS), internet protocol, instant messaging, voice sessions (e.g., via a phone network), email, or other types of communication. Further, it is contemplated that provisioning engine 107 and load balancing platform 101 may exchange O&M messages whenever any provisioning information is modified. Typically, an operator may only partially modify the configuration of base station 105, leaving much of the configuration intact. In those situations, O&M message 300 may only include those information elements that have been modified. Also, in case of extensive changes to the configuration of base station 105, the modifications may be divided into multiple O&M messages 300.

Figure 4:
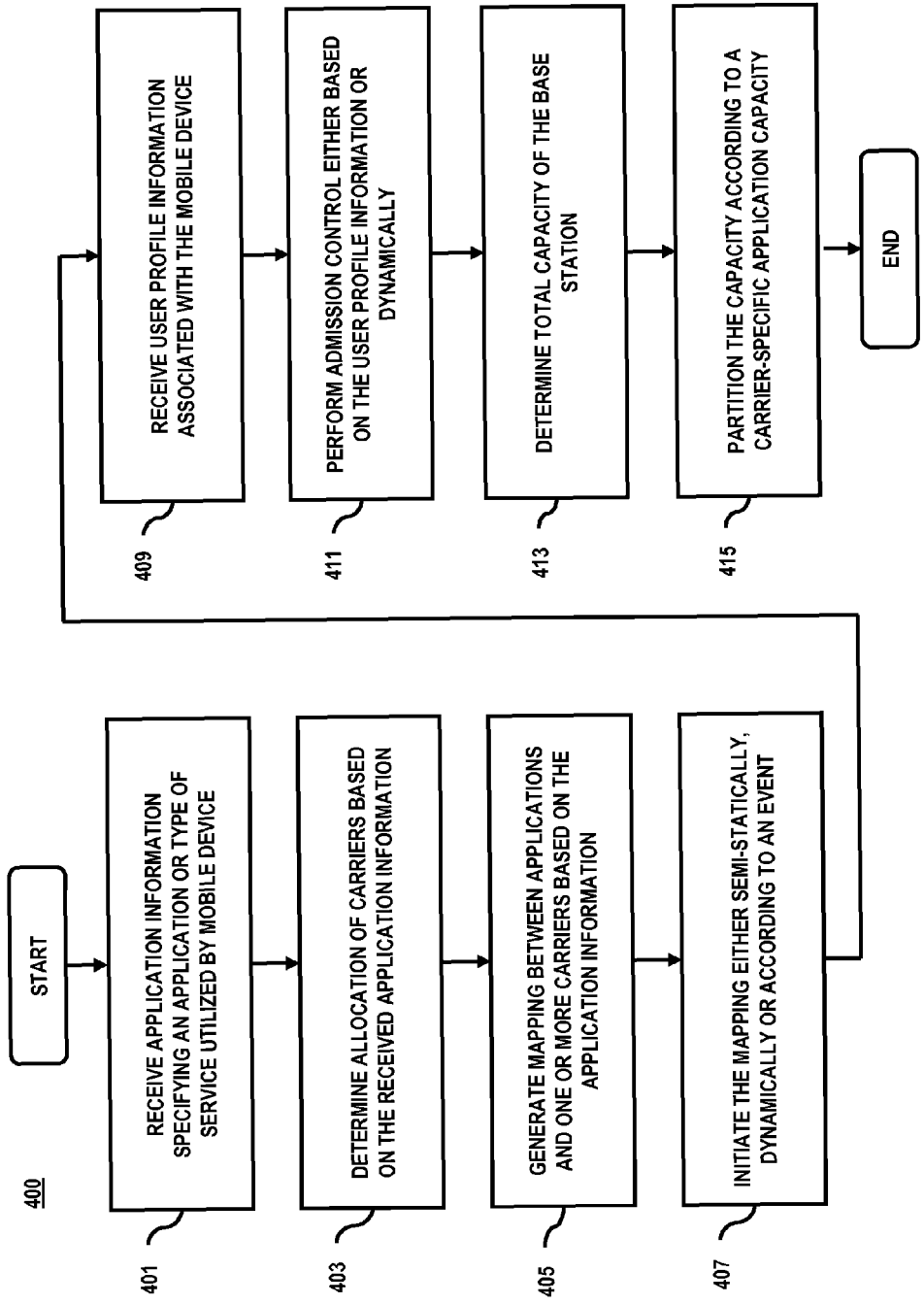
FIG. 4 is a flow chart for providing application-aware load balancing, according to an embodiment.

FIG. 4 is a flow chart of a process for providing application-aware load balancing, according to an exemplary embodiment. For illustrative purpose, process 400 is described with respect to the system of FIG. 1. It is noted that the steps of process 400 may be performed in any suitable order, as well as combined or separated in any suitable manner By way of example, base station 105 may be provisioned to provide application-aware load balancing with respect to video streaming application 123 (e.g., YouTube) for an event (e.g., music concert).

In step 401, load balancing platform 101 receives application information specifying applications or services utilized by one or more mobile devices 103. The applications may include one or more applications from a set of applications $A=\{A_1 \ldots A_J\}$. In addition to video streaming application 123 of our illustrative example, the set A may include, for example, social networking application 117 (e.g., Facebook, Twitter, etc.), email application 119 (e.g., Gmail, Yahoo Mail, AOL Mail, etc.), and instant messaging application 121 (e.g., Google Chat, Yahoo IM, etc.), among others. The received application information may also include bandwidth partitioning and application mapping information. The bandwidth partitioning information may indicate the amount of bandwidth in one or carriers that should be allocated to a particular application. The received application information may also include timing information indicating a time period for which the bandwidth partitioning and application mapping rules are applicable. The application information may further include subscription information indicating a list of applications users of mobile devices 103a re authorized to access.

In step 403, load balancing platform 101 determines an allocation of carriers based on the received application information. As mentioned with respect to system 100, the radio frequency spectrum of base station 105 may be divided among multiple carriers operating at regularly spaced frequencies. Further, the spectrum may also be divided in the temporal dimension so as to create a scheme of non-overlapping time and frequency blocks. In one embodiment, step 403 may involve load balancing platform 101 determining a load balancing scheme for assigning the applications in set A to various carriers. The load balancing scheme may thus ensure that the load on base station 105 is evenly distributed across its radio frequency spectrum.

In step 405, load balancing platform 101 generates a mapping between applications and one or more carriers based on the mapping information contained in the application information received in step 401. This mapping information may indicate a mapping between one or more applications and a set of one or more carriers $F=\{F_1 \ldots F_N\}$ and may be a list indexed by application name (e.g., application $A_1$ is mapped to carriers $F_1$ and $F_3$, application $A_2$ is mapped to carrier $F_4$). Thus, the mapping information may indicate that video streaming application 123 is to be mapped to one or more carriers. In one embodiment, step 405 may further involve load balancing platform 101 converting the received mapping information into a form compatible with a proprietary internal mapping of base station 105.

In step 407, load balancing platform 101 initiates the mapping. The mapping may be a set of call admission policies initiated to constrain the call scheduling activities of load balancing module 201. In one embodiment, these policies may be implemented by control module 205 configuring admission control module 203. The mapping may be initiated statically, semi-statically, dynamically, or according to an event. Thus, in one embodiment, control module 203 may further configure admission control module 203 so that the mapping takes effect at a specific time and for a specific duration. A static allocation may remain in place for an indefinite period of time lasting weeks, months, or years. A semi-static mapping may be configured to begin at a particular time and remain in place for a number of hours or days. An event-based mapping may last for the duration of a specific event. A dynamic mapping may take effect at the time a mobile device (e.g., mobile device 103a) attempts to access the mapped applications. Thus, continuing with our illustrative example, the mapping of video streaming application 123 may be configured to last for the duration of the music concert.

In step 409, load balancing platform 101 receives user profile information associated with mobile devices 103. The user profile information may include subscription information (e.g., a list of applications the user is authorized to access), authentication information (e.g., username and password), and device information (e.g., device multiband capability). For example, the received user profile information may indicate whether a particular user is authorized to access video streaming application 123. In addition, the profile information for that user may also include authentication credentials to access video streaming application 123.

In step 411, load balancing platform 101 performs admission control dynamically or based on the user profile information. In one embodiment, admission control module 203 applies the mapping information and associated timing as a set of gatekeeping policies with respect to the scheduling activities of load balancing module 201. During a period when an application mapping is active (e.g., during the music concert or our illustrative example), admission control module 203 may limit scheduling of a carrier to one or more mobile devices 103 that are authorized to access the application the carrier is mapped to. Similarly, if a user attempts to access an application that is not mapped to the carrier, admission control module 203 may assign the user to a different carrier. Admission control module 203 may allow a user to connect to the carrier even when the user is not currently accessing the application if the user's profile information indicates that the user is authorized to access the mapped application.

In step 413, load balancing platform 101 determines the total capacity of base station 105. In one embodiment, the total capacity may be determined as the aggregate bandwidth of all the carriers on base station 105. The total capacity of base station 105 may change between successive capacity determinations by process 400 due to rapidly changing radio channel quality.

In step 415, load balancing platform 101 partitions the total capacity according to a carrier-specific application capacity. For example, the partitioning can be between carrier-specific application capacity, and a non-carrier specific application capacity. In one embodiment, admission control module 203 may divide the total bandwidth of base station 105 among various classes of traffic, including a carrier-specific application capacity. The bandwidth allocation to each class may be indicated as a percentage value (e.g., 50% to CBR traffic, 30% to BE traffic, and 10% to carrier-specific applications). Thus, continuing with our example, admission control module 203 may allocate a certain portion of the total capacity to video streaming application 123.

After the steps of process 400 have been completed, load balancing platform 101 may rely on a software-based PF or weighted PF algorithm to evenly distribute calls among available carriers. This may involve assigning, reassigning or handing off calls. New calls may be added if there are enough resources to satisfy the QOS requirements of various classes of traffic. However, the call admission policies initiated in steps 407 and 411 of process 400 may constrain the call scheduling activities of load balancing module 201 to obtain a desired level of QOS for a particular application at the radio access network. Specifically, admission control module 203 may rely on various application-aware call admission and scheduling policies to assign new calls or reassign existing calls to a particular carrier.

The processes described herein for application-aware load balancing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
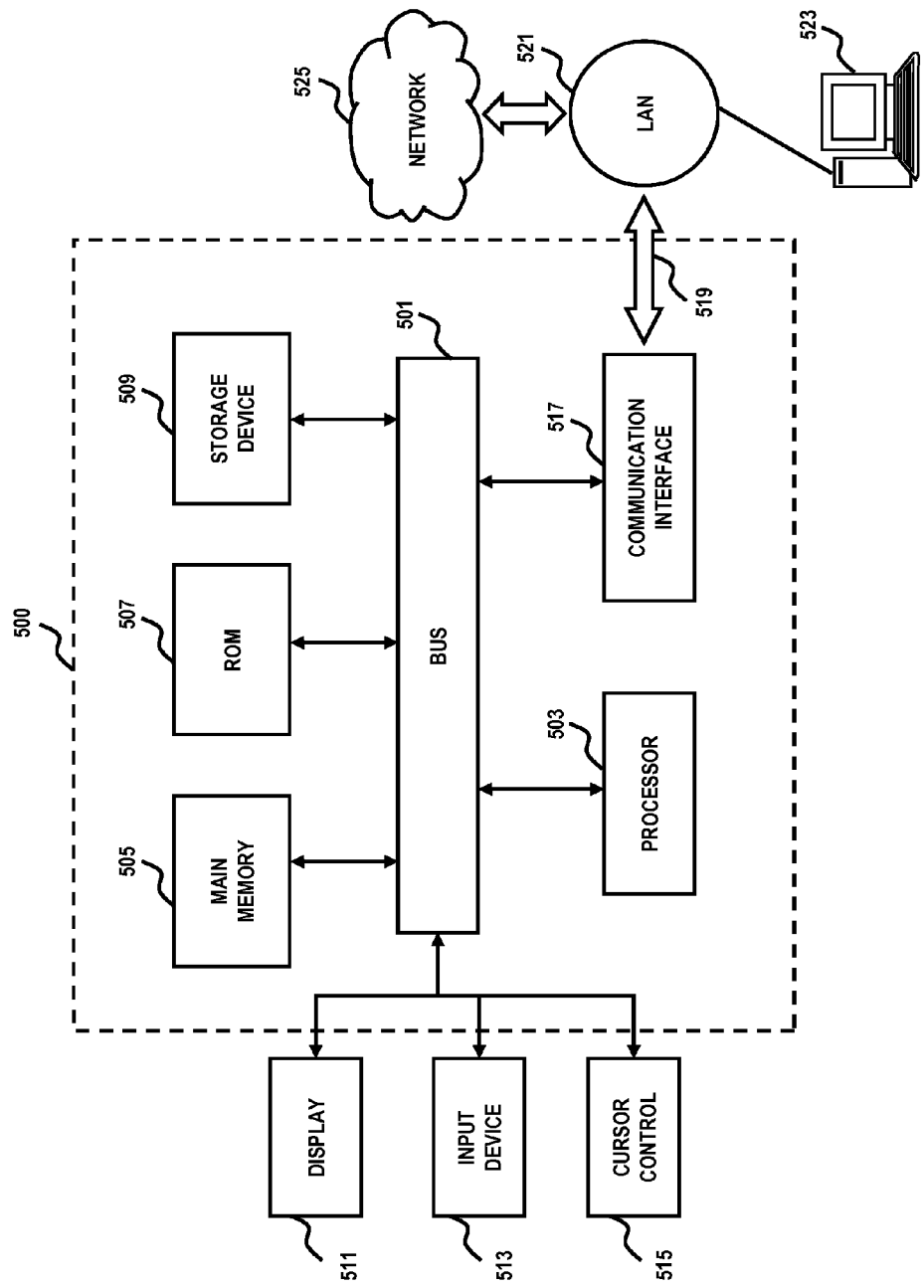
FIG. 5 is a diagram of a computer system that can be used to implement various embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk, flash storage, or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. Additional output mechanisms may include haptics, audio, video, etc. An input device 513, such as a keyboard including alphanumeric and other keys, is coupled to the bus 501 for communicating information and command selections to the processor 503. Another type of user input device is a cursor control 515, such as a mouse, a trackball, touch screen, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

Figure 6:
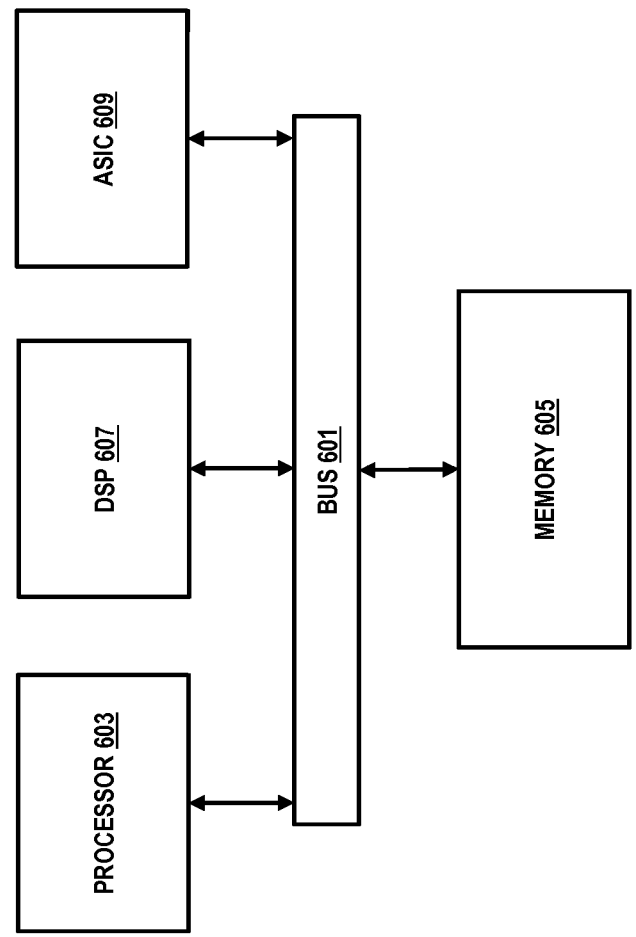
FIG. 6 is a diagram of a chip set that can be used to implement an embodiment of the invention.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 6, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable application-aware load balancing as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling application-aware load balancing.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writeable optical disk, etc.) and static memory (e.g., ROM, CD-ROM, etc.) for storing executable instructions that when executed perform the inventive steps described herein to enable application-aware load balancing. The memory 605 also stores the data associated with or generated by the execution of the inventive steps.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method of a load management implemented by a load management platform in a base station, comprising:
   receiving, from a provisioning engine of a service provider network in an Operation and Management (O&M) message, application information associated with a plurality of applications or type of service utilized by one or more mobile devices, wherein the application information includes, in separate fields of the O&M message, at least a bandwidth partitioning information, a mapping information, a first timing information, a second timing information, a subscription information and a multiband information;
   generating mapping between the plurality of applications and one or more of the plurality of carriers based on the mapping information,
   allocating, based on the bandwidth partitioning information, a total bandwidth of each of the plurality of carriers among different classes of traffic, during one or more time periods indicated by the first timing information and deallocating the total bandwidth after the one or more time periods elapse;
   implementing the mapping, for one or more time periods indicated by the second timing information, according to the generated mapping information, enforcing call admission policies with respect to calls originating from the one or more mobile devices and constraining the call scheduling activities of the load management platform;
   performing call admission control based on the subscription information, wherein the subscription information includes authorization of the one or more mobile devices to access corresponding ones of the plurality of applications; and
   determining that the one or more mobile devices are capable of operating in one of a singular band and multiple bands based on the multiband information.

2. A method according to claim 1, further comprising:
   initiating the mapping either statically, semi-statically, dynamically, or according to an event.

3. A method according to claim 1, wherein the subscription information is included in a user profile information associated with the mobile device, wherein the allocating provides load balancing across the plurality of carriers.

4. A method according to claim 1, wherein the plurality of carriers correspond to one or a plurality of base stations configured to serve the mobile device.

5. A method according to claim 4, wherein the load balancing is performed at one or a plurality of base stations.

6. A method according to claim 5, further comprising: determining a total capacity per base station; and partitioning the capacity according to a non-carrier specific application capacity.

7. A load management apparatus comprising:
   at least one processor; and
   at least one memory including computer program code for one or more programs, the at least one memory and the computer program code configured to, with the at least one processor, cause the apparatus to perform at least the following,
   receive, from a provisioning engine of a service provider network in an Operation and Management (O&M) message, application information associated with a plurality of applications or type of service utilized by one or more mobile devices, wherein the application information includes, in separate fields of the O&M message, at least a bandwidth partitioning information, a mapping information, a first timing information, a second timing information, a subscription information and a multiband information;
   generate mapping between the plurality of applications and one or more of a plurality of carriers based on the mapping information;
   allocate, based on the bandwidth partitioning information, a total bandwidth of each of the plurality of carriers among different classes of traffic, during one or more time periods indicated by the first timing information and deallocating the total bandwidth after the one or more time periods elapse;
   implement the mapping, for one or more time periods indicated by the second timing information, according to the generated mapping, enforcing call admission policies with respect to calls originating from the one or more mobile devices and constraining the call scheduling activities of a load management platform;
   perform call admission control based on the subscription information, wherein the subscription information includes authorization of the one or more mobile devices to access corresponding ones of the plurality of applications; and
   determine that the one or more mobile devices are capable of operating in one of a singular band and multiple bands based on the multiband information.

8. The apparatus according to claim 7, wherein the apparatus is further caused to:
   initiate the mapping either statically, semi-statically, dynamically, or according to an event.

9. The apparatus according to claim 7, wherein the subscription information is included in a user profile information associated with the mobile device, wherein the allocating provides load balancing across the plurality of carriers.

10. The apparatus according to claim 7, wherein the plurality of carriers correspond to one or a plurality of base stations configured to serve the mobile device.

11. A system comprising:
    a provisioning engine; and
    a base station configured to interface with the provisioning engine and provide connectivity to one or more mobile devices, wherein the provisioning engine includes a network interface that is coupled to a service provider network for sending one or more operation and administration (O&M) packets to the base station, each of the O&M packets comprising in separate fields: a bandwidth partitioning information, a mapping information, a first timing information, a second timing information, a subscription information and a multiband information, wherein the base station is further configured to:

generate mapping between the plurality of applications and one or more of the plurality of carriers based on the mapping information;

allocate, based on the bandwidth partitioning information, a total bandwidth of each of the plurality of carriers among different classes of traffic, during one or more time periods indicated by the first timing information and deallocating the total bandwidth after the one or more time periods elapse;

implement the mapping, for one or more time periods indicated by the second timing information, according to the generated mapping information, enforce call admission policies with respect to calls originating from the one or more mobile devices and constrain the call scheduling activities of the load management platform;

perform call admission control based on the subscription information, wherein the subscription information includes authorization of the one or more mobile devices to access corresponding ones of the plurality of applications; and determine that the one or more mobile devices are capable of operating in one of a singular band and multiple bands based on the multiband information.

12. The system of claim 11, wherein the mapping occurs semi-statically, dynamically, or according to an event.

13. The system of claim 11, wherein the subscription information specifies one or more other applications or types of service the mobile device is authorized to access.

14. The system of claim 13, wherein the subscription information is based on a user profile associated with the mobile device.

15. The system of claim 11, further comprises: partitioning a total bandwidth of the base station according to a non-carrier-specific application capacity information.

16. The system of claim 15, wherein
the bandwidth partitioning occurs semi-statically, dynamically, or according to an event.

* * * * *